United States Defensive Publication [19] (H) [11] T983,004

Taylor et al. [43] Jun. 5, 1979

[54] STABILIZED WAX COMPOSITIONS AND THEIR PREPARATION

[76] Inventors: Marcia A. Taylor, 164 Walton Ct., Kingsport, Tenn. 37663; Robert J. Evans, 2060 Canterbury Rd., Kingsport, Tenn. 37660

[21] Appl. No.: 907,229

[22] Filed: May 18, 1978

[51] Int. Cl.[2] ..... B32B 9/00; B32B 15/04; C08L 91/06

[52] U.S. Cl. ..... 428/467; 106/270; 106/271; 106/245; 428/485

[57] ABSTRACT

Disclosed is a means to disperse the antioxidant monotertiarybutyl hydroquinone (TBHQ) in wax, particularly paraffin wax, in concentrations of up to about 2.5% by weight of the wax through the use of acetylated monoglycerides as solvents for the TBHQ which renders the TBHQ and wax highly compatible. Such stabilized wax compositions find extensive use as coatings for food and in waxed liners for food cartons and the like.

7 Claims, No Sheets Drawing,

10 Pages Specification

The file of this unexamined application may be inspected and copies thereof may be purchased (849 O.G. 1221, Apr. 9, 1968).